Figure 1:
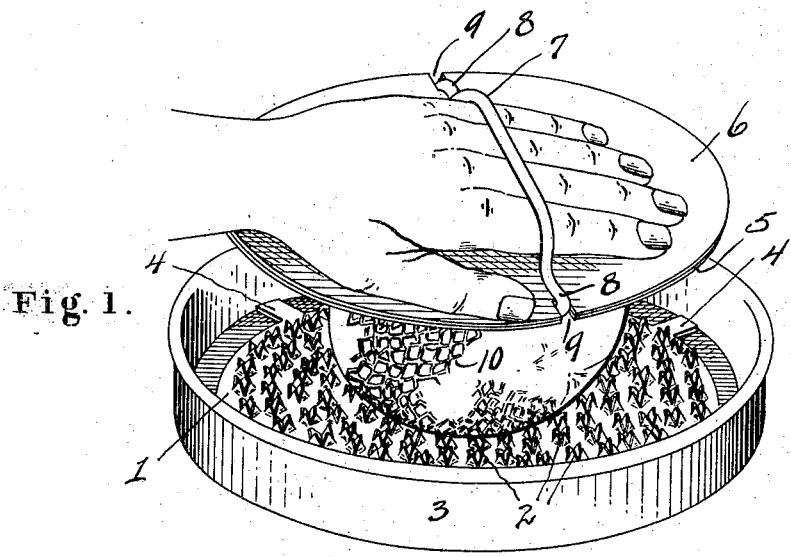

J. G. LANNOYE.
SCARIFYING DEVICE FOR FRUITS AND VEGETABLES.
APPLICATION FILED JUNE 12, 1911.

1,016,338.

Patented Feb. 6, 1912.

WITNESSES:
Walter Greenburg
Clifford Clark

INVENTOR.
Joseph G. Lannoye
BY Charles E. Wiser
ATTORNEY.

UNITED STATES PATENT OFFICE.

JOSEPH G. LANNOYE, OF DETROIT, MICHIGAN.

SCARIFYING DEVICE FOR FRUITS AND VEGETABLES.

1,016,338. Specification of Letters Patent. Patented Feb. 6, 1912.

Application filed June 12, 1911. Serial No. 632,652.

*To all whom it may concern:*

Be it known that I, JOSEPH G. LANNOYE, a citizen of the United States, residing at Detroit, county of Wayne, State of Michigan, have invented a certain new and useful Improvement in Scarifying Devices for Fruits and Vegetables, and declare the following to be a full, clear, and exact description of the same, such as will enable others skilled in the art to which it pertains to make and use the same, reference being had to the accompanying drawings, which form a part of this specification.

This invention relates to a method and means for preparing fruits and vegetables for consumption or analogous use and its object is a device adapted to cut or scarify the skin of a fruit or a vegetable in such manner that it is divided into small particles which, while adhering to the body of the fruit, not only causes no inconvenience in the eating thereof either in a raw or cooked state by reason of their small size, but the presence of the skin in a cooked apple, for instance, adds to its aroma and those nutritious elements usually lost in a peeling operation are retained thereby increasing its flavor. Besides being more economical than peeling the fruit, this method of treatment also results in a great saving of time as a number of apples or the like may be scarified in the time that one may be peeled.

The device shown in the drawings is more particularly adapted for household use and comprises a pair of scarifying plates between which the fruit or vegetable is to be subjected to a rolling motion produced by the hand of the operator. The principle here involved, however, may very readily be utilized in a device of greater capacity suitable for hotel use, etc., where large quantities of such articles are necessarily prepared at a time.

These and other objects and novelties of the invention are hereinafter more fully described and claimed.

Figure 2:
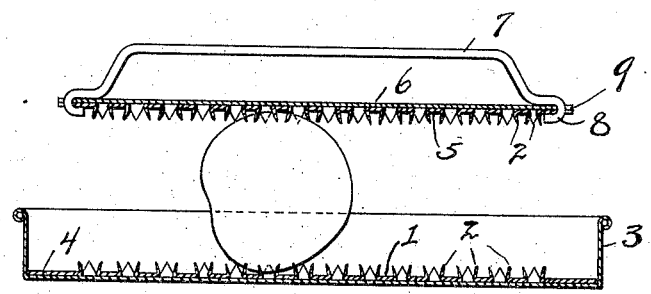
Figure 3:
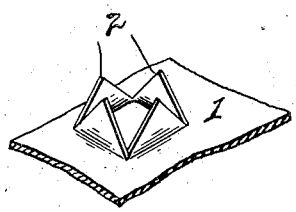

In the drawings—Figure 1 is a perspective view of my device as in operation. Fig. 2 is a vertical central section of the device showing the relative position of the scarifying plates. Fig. 3 is a detail of a scarifying unit formed of triangular cutting teeth.

Similar characters refer to similar parts throughout the drawings and specification.

In the device as shown, the scarifying plate 1 consists of a thin metallic plate through which are punched a series of substantially square holes from which the metal is displaced in such manner that each perforation is surrounded by four raised triangular cutting teeth 2 rising substantially perpendicularly from the plate at right angles to each other. The plate 1 is adapted to be placed in a shallow imperforate, pan 3 forming a support therefor which is somewhat larger in diameter than the plate and to prevent a displacement of the plate, it is provided with marginal lugs or projections 4 to hold it centrally within the pan and permit of its ready removal.

The scarifying plate 5 is similar to plate 1, having no lugs but being practically identical in other ways and an imperforate plate 6 is provided on the back thereof and detachably secured thereto by the bail or handle 7 formed of spring metal and having hooks 8 formed at the ends adapted to engage in corresponding notches 9 provided in the edges of the plates 5 and 6.

In operation, an apple or the like is placed between the plates 1 and 5, as shown in Figs. 1 and 2, and by inserting the hand beneath the bail 7 and rolling the apple between the plates by moving the hand in a substantially circular path, the skin will be cut or divided into small particles as indicated at 10 in Fig. 1. In order that the whole surface may be properly scarified, the direction of movement of the hand should be frequently changed during the operation as a truly circular movement would only scarify a part of said surface about the center of rotation of the fruit and consequently, the more sinuous the path of movement the more quickly will the fruit be properly scarified.

Should any juice escape during the above described operation, it is collected in the pan and the imperforate plate forming a backing for the plate 5 prevents the juices or pulp from coming in contact with the hand. By making the parts separable as described the device may very readily be taken apart and cleaned.

It is to be noted that, by making the teeth in the triangular form shown, slits are produced in the skin forming substantially rectangles or squares with the corners thereof unconnected. Each particle of skin, therefore, is connected to contiguous particles by this uncut part at each corner of the square which leaves the skin adhering to the body of the fruit presenting a much better appearance than if the skin hung in shreds. The continuous rotation of the fruit over the teeth will cut the skin into much smaller particles as the squares above described will overlap to a greater or less extent producing a roughened appearance in the fruit which, obviously, is not a detriment if the fruit is to be sliced or stewed. However, if an apple for instance is to be baked or steamed care should be exercised in not scarifying the skin to a greater extent than is necessary for the purpose as heretofore outlined. For household use the device may be made of tin and is adaptable for use on a great variety of fruits or vegetables, as potatoes or oranges and if in either case it is desired to remove the entire skin, it will be accomplished much more readily if they are first scarified in the manner stated, as the rolling between the plates, particularly with oranges or the like, loosens the skin from the body of the fruit as well as cuts it into small particles.

From the above description it becomes evident that the process is different from that in devices which produce an abrasive action for the purpose of removing the skin and also requires much less labor than peeling. Other shapes of the plates and forms of the teeth may also be readily devised that will effectually scarify the skin without departing from the spirit of this invention but the forms shown are preferable for the reasons above given. It is also evident that the principle herein described may be utilized commercially for the purpose of preparing fruits etc., for canning or evaporating with such slight alterations in the structure that only ordinary mechanical skill is required to thus enlarge its scope.

What I claim and desire to secure by Letters Patent of the United States is—

1. In a device for the purpose described, a pair of plates provided with cutting teeth, an imperforate support for one of the plates, the other plate being formed of a single, disk-shaped, piece of metal and being movable in all directions when in operative relation with the first named plate, and a handle by means of which said other plate may be manipulated.

2. In a device for the purpose described, a flat plate, a support therefor, a flat plate adapted to rest upon a fruit or vegetable, said plate being movable in all directions when in operative relation with the supported plate, both of said plates having cutting teeth, and a handle for moving the movable plate whereby said fruit or vegetable may be rolled between the plates.

3. In a device for the purpose described, a pair of scarifying plates each having cutting teeth, an imperforate pan for the support of one of the plates, said supported plate having laterally extending lugs or projections integrally formed therewith for positioning it in the pan, the other plate being unsupported and free to move in all directions when in operative relation with the supported plate, and a handle for manipulating the movable plate.

4. In a scarifying device for fruits or vegetables, a pair of scarifying plates, one of said plates being fixed and the other being unsupported and movable in all directions when in operative position with the fixed plate, and each of said plates being provided with triangular cutting teeth raised from the material of the plate in groups surrounding the apertures in the plate from which they are raised.

5. In a scarifying device for fruits and vegetables, a pair of scarifying plates, one of said plates being fixed and the other movable and each being provided with triangular cutting teeth raised from the material of the plate, an imperforate pan for the support of the fixed plate, said movable plate being unsupported and free to move in all directions when in operative relation with the fixed plate, an imperforate plate forming a backing for the movable plate, said imperforate plate and movable plate having correspondingly positioned, marginal notches, and a clamping handle engaging in said notches and adapted to detachably secure the two plates together.

In testimony whereof, I sign this specification in the presence of two witnesses.

JOSEPH G. LANNOYE.

Witnesses:
RICHARD ALSPAS,
WALTER GREENBURG.

---

Copies of this patent may be obtained for five cents each, by addressing the "Commissioner of Patents, Washington, D. C."